US012793718B2

(12) United States Patent
Looney et al.

(10) Patent No.: US 12,793,718 B2
(45) Date of Patent: Nov. 10, 2026

(54) CENTRALIZED SYNTHETIC SPEECH DETECTION SYSTEM USING WATERMARKING

(71) Applicant: PINDROP SECURITY, INC., Atlanta, GA (US)

(72) Inventors: David Looney, Atlanta, GA (US); Nikolay Gaubitch, Atlanta, GA (US); Elie Khoury, Atlanta, GA (US)

(73) Assignee: Pindrop Security, Inc., Atlanta, GA (US)

(*) Notice: Subject to any disclaimer, the term of this patent is extended or adjusted under 35 U.S.C. 154(b) by 124 days.

(21) Appl. No.: 18/777,278

(22) Filed: Jul. 18, 2024

(65) Prior Publication Data

US 2025/0029614 A1 Jan. 23, 2025

Related U.S. Application Data

(60) Provisional application No. 63/515,002, filed on Jul. 21, 2023.

(51) Int. Cl.
*G10L 17/02* (2013.01)

(52) U.S. Cl.
CPC .................................... *G10L 17/02* (2013.01)

(58) Field of Classification Search
CPC ........ G10L 17/02; G10L 25/69; G10L 19/018
See application file for complete search history.

(56) References Cited

U.S. PATENT DOCUMENTS

| | | | | |
|---|---|---|---|---|
| 8,121,342 | B2 * | 2/2012 | Davis | G06F 21/16 382/100 |
| 9,715,873 | B2 * | 7/2017 | Graham | G10L 13/08 |
| 9,865,253 | B1 * | 1/2018 | De Leon | G10L 25/90 |
| 10,755,694 | B2 * | 8/2020 | Alameh | G10L 13/047 |
| 12,041,138 | B1 * | 7/2024 | Mahajan | G06F 16/43 |
| 12,518,741 | B2 * | 1/2026 | Rosenberg | G10L 15/063 |
| 2008/0002854 | A1 * | 1/2008 | Tehranchi | H04N 1/32352 382/100 |
| 2019/0043472 | A1 * | 2/2019 | Garcia | G10L 21/003 |
| 2019/0287513 | A1 * | 9/2019 | Alameh | G10L 17/00 |
| 2021/0050024 | A1 * | 2/2021 | Wouters | G10L 19/125 |
| 2021/0118423 | A1 * | 4/2021 | Ping | G10L 19/018 |
| 2021/0233204 | A1 * | 7/2021 | Alattar | G06T 1/0028 |
| 2022/0172739 | A1 * | 6/2022 | Shor | G10L 15/02 |
| 2022/0345790 | A1 * | 10/2022 | Engi | H04N 7/147 |
| 2022/0414244 | A1 * | 12/2022 | Atluri | G06F 16/176 |
| 2023/0260521 | A1 * | 8/2023 | Slocum | G10L 17/18 704/232 |
| 2024/0005947 | A1 * | 1/2024 | Wang | G10L 25/51 |
| 2024/0221735 | A1 * | 7/2024 | Taylor-Sullivan | G10L 15/30 |
| 2024/0221763 | A1 * | 7/2024 | Ginsburg | G10L 13/033 |
| 2024/0235847 | A1 * | 7/2024 | Jacobson | H04L 9/3247 |
| 2024/0304175 | A1 * | 9/2024 | Erdmann | G10L 13/047 |
| 2024/0355336 | A1 * | 10/2024 | Altaf | G10L 17/06 |

* cited by examiner

*Primary Examiner* — Anne L Thomas-Homescu
(74) *Attorney, Agent, or Firm* — Foley & Lardner LLP

(57) ABSTRACT

Disclosed are systems and methods including software processes executed by a server for obtaining, by a computer, an audio signal including synthetic speech, extracting, by the computer, metadata from a watermark of the audio signal by applying a set of keys associated with a plurality of text-to-speech (TTS) services to the audio signal, the metadata indicating an origin of the synthetic speech in the audio signal, and generating, by the computer, based on the extracted metadata, a notification indicating that the audio signal includes the synthetic speech.

20 Claims, 10 Drawing Sheets

600

700

CENTRALIZED SYNTHETIC SPEECH DETECTION SYSTEM USING WATERMARKING

CROSS-REFERENCE TO RELATED APPLICATIONS

This application claims the benefit of U.S. Provisional Application No. 63/515,002, filed Jul. 21, 2023, which is incorporated by reference in its entirety.

TECHNICAL FIELD

This application generally relates to analyzing audio signals for voice authentication. In particular, this application relates to identifying synthetic speech or other types of fraudulent replay attacks in audio signals.

BACKGROUND

Rapid development in generative artificial intelligence (AI) has resulted in several large models that are able to synthesize high-quality realistic text, images, video and audio commonly known as "deepfakes." While there may be many several benefits from such synthetic data, there is also a great risk to mass-media and telecommunications. As an example, text-to-speech (TTS) synthesis can generate a synthetic voice that is designed to imitate the voice of a real person. Credible voice imitation can be achieved with as little as a few seconds of recorded speech from a target speaker. There are a number of threats emerging from voice-cloning technology, including threats to institutions that use voice to identify and authenticate a person. Voice recognition is frequently used in call centers, voice assistants and other IoT applications to verify the authenticity of a user through their voice. It is, therefore, beneficial to ensure that these systems are robust to attacks using synthetically-generated speech.

SUMMARY

Disclosed herein are systems and methods capable of addressing the above-described shortcomings and may also provide any number of additional or alternative benefits and advantages. Voice synthesis, voice conversion and modification may also be used to evade detection by voice-based fraud-detection tools. Embodiments discussed herein provide for a centralized analysis service that can define and/or enforce a watermarking standard for synthetic speech. Text-to-speech (TTS) services can include watermarks complying with the watermarking standard in synthetic speech (e.g., generated speech, modified speech, converted speech) such that the centralized analysis service can identify synthetic speech from a plurality of different TTS services, providing high confidence as to whether audio includes synthetic speech. Furthermore, the watermarks can include metadata indicating an origin of synthetic speech (e.g., which TTS service), when the synthetic speech was generated, who generated the synthetic speech, and/or whether the synthetic speech is generated using audio authorized for use in generating synthetic speech. In an example, the analysis service detects a watermark and extracts metadata of the watermark to determine which TTS service generated the synthetic speech, which user of the TTS service generated the synthetic speech, and/or whether the synthetic speech was authorized by a person whose voice was used to generate the synthetic speech. The analysis service can transmit an alert to the TTS service of an attempted use of the synthetic speech to allow the TTS service to sanction improper use of the TTS service.

Aspects of the present disclosure are directed to a computer-implemented method including obtaining, by a computer, an audio signal including synthetic speech, extracting, by the computer, metadata from a watermark of the audio signal by applying a set of keys associated with a plurality of TTS services to the audio signal, the metadata indicating an origin of the synthetic speech in the audio signal, and generating, by the computer, based on the metadata as extracted from the watermark, a notification indicating that the audio signal includes the synthetic speech.

In some implementations, the method includes generating a score for each key of the set of keys to determine that the audio signal includes the watermark, wherein the watermark was generated using the key of the set of keys. In some implementations, the method includes transmitting the key to a TTS service to generate the watermark. In some implementations, the metadata includes one or more of a service identifier of a TTS service, a model identifier of a TTS model, a user identifier of a user of the TTS service, or a timestamp indicating when the synthetic speech was generated. In some implementations, the method includes transmitting an alert to a TTS service based on the origin of the synthetic speech in the audio signal. In some implementations, the notification includes a portion of the metadata as extracted from the watermark.

In some implementations, the method includes receiving, by the computer, from the origin of the synthetic speech, the audio signal including the watermark, determining, by the computer, that a robustness of the watermark exceeds a predetermined threshold, and transmitting an approval of the watermark to the origin of the synthetic speech. In some implementations, the watermark includes a consent watermark, and wherein the notification indicates usage consent parameters of the consent watermark. In some implementations, the watermark includes an authorization watermark, and wherein the notification indicates authorization parameters of the authorization watermark.

In some implementations, the method includes obtaining, by the computer, a second audio signal including second synthetic speech, extracting, by the computer, second metadata from a second watermark of the second audio signal, the second metadata indicating a second origin of the second synthetic speech that is different from the origin of the audio signal including the synthetic speech, and generating, by the computer, a second notification indicating that the second audio signal includes the second synthetic speech.

Aspects of the present disclosure are directed to a system including a computing device including at least one processor, configured to obtain an audio signal including synthetic speech, extract metadata from a watermark of the audio signal by applying a set of keys associated with a plurality of TTS services to the audio signal, the metadata indicating an origin of the synthetic speech in the audio signal, and generate, based on the metadata as extracted from the watermark, a notification indicating that the audio signal includes the synthetic speech.

In some implementations, the computing device is further configured to generate a score for each key of the set of keys to determine that the audio signal includes the watermark, the key used to generate the watermark. In some implementations, the computing device is further configured to transmit the key to a TTS service to generate the watermark. In some implementations, the metadata includes one or more of a service identifier of a TTS service, a model identifier of a TTS model, a user identifier of a user of the TTS service, or a timestamp indicating when the synthetic speech was generated. In some implementations, the computing device is configured to transmit an alert to a TTS service based on the origin of the synthetic speech in the audio signal. In some implementations, the notification includes a portion of the metadata as extracted from the watermark.

In some implementations, the computing device is configured to receive from the origin of the synthetic speech, the audio signal including the watermark, determine that a robustness of the watermark exceeds a predetermined threshold, and transmit an approval of the watermark to the origin of the synthetic speech. In some implementations, the watermark includes a consent watermark, and wherein the notification indicates one or more usage consent parameters of the consent watermark.

In some implementations, the watermark includes an authorization watermark, and wherein the notification indicates one or more authorization parameters of the authorization watermark. In some implementations, the computing device is configured to obtain a second audio signal including second synthetic speech, extract second metadata from a second watermark of the second audio signal, the second metadata indicating a second origin of the second synthetic speech that is different from the origin of the audio signal including the synthetic speech, and generate a second notification indicating that the second audio signal includes the second synthetic speech.

It is to be understood that both the foregoing general description and the following detailed description are exemplary and explanatory and are intended to provide further explanation of the invention(s) and features as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
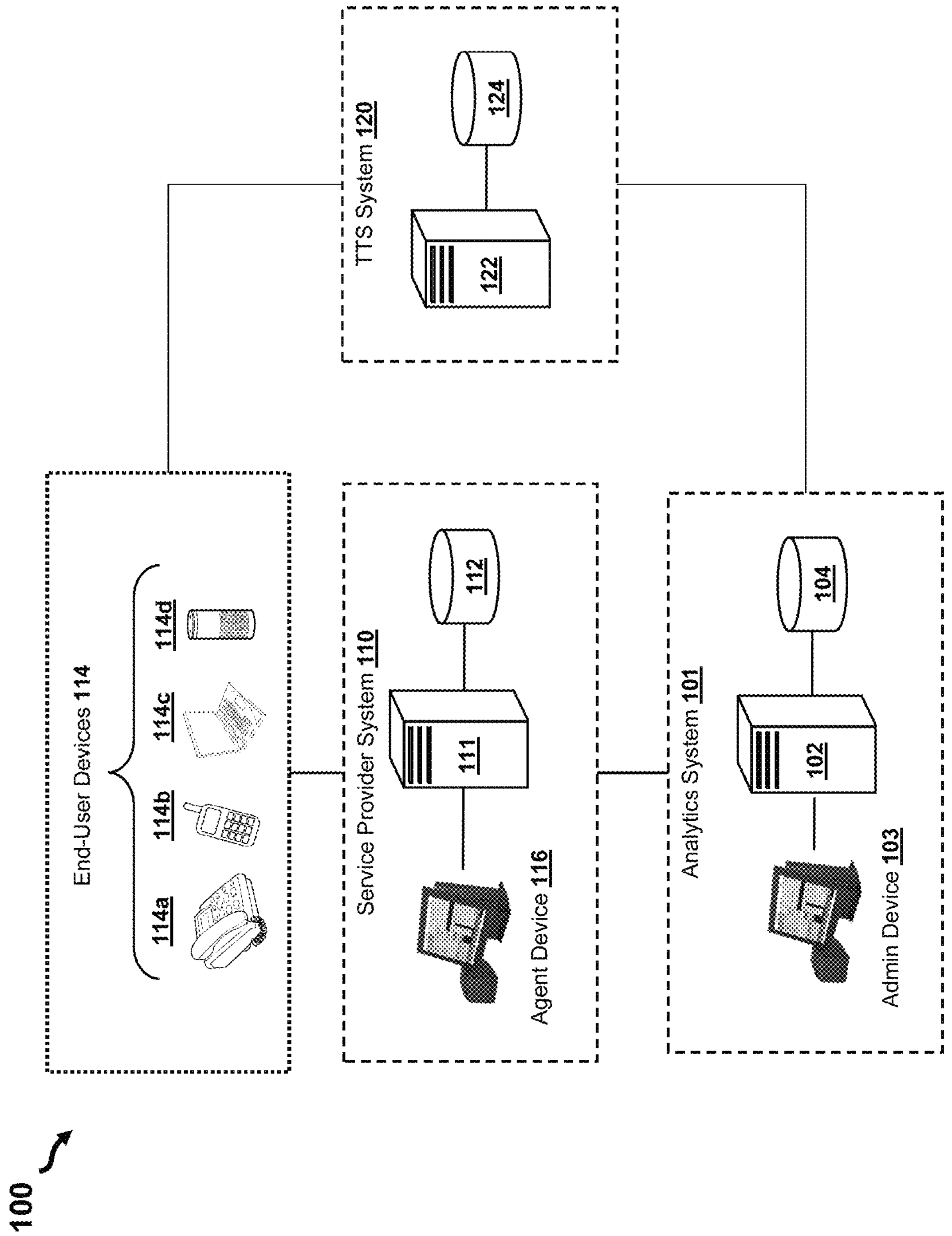
FIG. 1 shows components of a system for receiving and analyzing call data received during contact events, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows components of a system 100 for receiving and analyzing call data received during contact events, according to an embodiment. The system 100 comprises an analytics system 101, service provider systems 110 of various types of enterprises (e.g., companies, government entities, universities), a text-to-speech (TTS) system 120, and the end-user devices 114 (e.g., landline phone 114*a*, mobile phone 114*b*, and computing device 114*c*). The analytics system 101 includes analytics servers 102, analytics databases 104, and admin devices 103. The service provider system 110 includes provider servers 111, provider databases 112, and agent devices 116. The TTS system 120 includes TTS servers 122 and TTS databases 124. Embodiments may comprise additional or alternative components or omit certain components from what is shown in FIG. 1, yet still fall within the scope of this disclosure. It may be common, for example, for the system 100 to include multiple provider systems 110 or multiple TTS systems 120, or for the analytics system 101 to have multiple analytics servers 102. It should also be appreciated that embodiments may include or otherwise implement any number of devices capable of performing the various features and tasks described herein. For example, the FIG. 1 shows the analytics server 102 as a distinct computing device from the analytics database 104, though in some embodiments, the analytics database 104 may be integrated into the analytics server 102.

The system 100 describes an embodiment of call risk analysis, which in some embodiments may include caller identification, performed by the analytics system 101 on behalf of the provider system 110. The risk analysis operations are based on audio watermarks indicating the presence of synthetic speech and/or other characteristics of a projected audio wave or observed audio signal captured by a microphone of an end-user device 114. The analytics server 102 executes software programming of a machine-learning architecture having various types of functional engines, implementing certain machine-learning techniques and machine-learning models for analyzing the call audio data, which the analytics server 102 receives from the provider system 110. The analytics server 102 may execute various algorithms for detecting audio watermarks and extracting metadata of the audio watermarks to identify synthetic speech. The machine-learning architecture and/or algorithms of the analytics server 102 analyze the various forms of the call audio data to perform the various risk assessment or caller identification operations.

The TTS system 120 may encode watermarks in synthetic speech generated by the TTS system 120 and provide information regarding the watermarks, such as keys used to encode and decode the watermarks, to the analytics system 101. In some implementations, the analytics system 101 provides the keys to the TTS system 120 or encodes the watermarks in the synthetic speech for the TTS system 120. In this way, the analytics system 101 is able to detect and decode (e.g., extract metadata) the watermarks in order to identify the synthetic speech (e.g., by applying the keys on the synthetic speech. Thus, when users access the TTS system 120 to generate the synthetic speech and attempt to use the synthetic speech at the service provider system 110, the analytics system 101 is able to identify the synthetic speech on behalf of the service provider system 110.

The various components of the system 100 may be interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., service provider systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

The analytics system 101, the provider system 110, and the TTS system 120 are network system infrastructures 101, 110, 120 comprising physically and/or logically related collections of software and electronic devices managed or operated by various enterprise organizations. The devices of each network system infrastructure 101, 110, 120 are configured to provide the intended services of the particular enterprise organization.

The analytics system 101 is operated by a call analytics service that provides various call management, security, authentication (e.g., speaker verification), and analysis services to customer organizations (e.g., corporate call centers, government entities). Components of the call analytics system 101, such as the analytics server 102, execute various processes using audio data in order to provide various call analytics services to the organizations that are customers of the call analytics service. In operation, a caller uses a caller end-user device 114 to originate a telephone call to the service provider system 110. The microphone of the caller device 114 observes the caller's speech and generates the audio data represented by the observed audio signal.

In some implementations, the audio data includes an audio watermark (e.g., watermark identifying the end-user device, watermark identifying the caller, watermark indicating synthetic speech) corresponding to synthetic speech generated by the TTS system 120. The caller device 114 transmits the audio data to the service provider system 110. The interpretation, processing, and transmission of the audio data may be performed by components of telephony networks and carrier systems (e.g., switches, trunks), as well as by the caller devices 114. The service provider system 110 then transmits the call analytics system 101 to perform various analytics and downstream audio processing operations. It should be appreciated that analytics servers 102, analytics databases 104, and admin devices 103 may each include or be hosted on any number of computing devices comprising a processor and software and capable of performing various processes described herein.

The service provider system 110 is operated by an enterprise organization (e.g., corporation, government entity) that is a customer of the call analytics service. In operation, the service provider system 110 receives the audio data and/or the observed audio signal associated with the telephone call from the caller device 114. The audio data may be received and forward by one or more devices of the service provider system 110 to the call analytics system 101 via one or more networks. For instance, the customer may be a bank that operates the service provider system 110 to handle calls from consumers regarding accounts and product offerings. Being a customer of the call analytics service, the bank's service provider system 110 (e.g., bank's call center) forwards the audio data associated with the inbound calls from consumers to the call analytics system 101, which in turn performs various processes using the audio data, such as analyzing the audio data to detect synthetic speech used to impersonate a customer of the bank, among other voice or audio processing services for risk assessment or speaker identification. It should be appreciated that service provider servers 111, provider databases 112 and agent devices 116 may each include or be hosted on any number of computing devices comprising a processor and software and capable of performing various processes described herein.

The end-user device 114 may be any communications or computing device the caller operates to place the telephone call to the call destination (e.g., the service provider system 110). The end-user device 114 may comprise, or be coupled to, a microphone. Non-limiting examples of caller devices 114 may include landline phones 114*a* and mobile phones 114*b*. It should be appreciated that the caller device 114 is not limited to telecommunications-oriented devices (e.g., telephones). As an example, a calling end-user device 114 may include an electronic device comprising a processor and/or software, such as a computing device 114*c* or Internet of Things (IoT) device, configured to implement voice-over-IP (VOIP) telecommunications. As another example, the caller computing device 114*c* may be an electronic IoT device (e.g., voice assistant device, "smart device") comprising a processor and/or software capable of utilizing telecommunications features of a paired or otherwise networked device, such as a mobile phone 114*b*.

In the example embodiment of FIG. 1, when the caller places the telephone call to the service provider system 110, the caller device 114 instructs components of a telecommunication carrier system or network to originate and connect the current telephone call to the service provider system 110. When the inbound telephone call is established between the caller device 114 and the service provider system 110, a computing device of the service provider system 110, such as a provider server 111 or agent device 116 forwards the observed audio signal (and/or audio data sampled using components in the calling device 114 from the observed audio signal) received at the microphone 124 of calling device 114 to the call analytics system 101 via one or more computing networks. The embodiment of FIG. 1 is merely a non-limiting example use for case of understanding and description.

The analytics server 102 of the call analytics system 101 may be any computing device comprising one or more processors and software, and capable of performing the various processes and tasks described herein. The analytics server 102 may host or be in communication with the analytics database 104 and may receive and process the audio data from the one or more service provider systems 110. Although FIG. 1 shows only a single analytics server 102, it should be appreciated that, in some embodiments, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the service provider system 110 (e.g., the service provider server 111).

In operation, the analytics server 102 may execute various software-based processes on the call data, which may include detection and/or identification of watermarks (i.e., audio watermarks) and extraction of metadata of the watermarks to identify synthesized speech. The operations of the analytics server 102 may include, for example, receiving the observed audio signal associated with the calling device 114, parsing the observed audio signal into frames and sub-frames, applying operations, in combination with a set of keys, to the observed audio signal to determine whether a corresponding watermark is present, and extracting metadata of the corresponding watermark. The set of keys may be used to generate watermarks associated with a standard. In this way, the compliance with the standard can be detected, and use of synthetic speech generated in compliance with the watermark standard can be detected along with metadata regarding the generation of the synthetic speech.

The analytics server 102 may perform various pre-processing operations on the observed audio signal during deployment. The pre-processing operations can advantageously improve the speed at which the analytics server 102 operates or reduce the demands on computing resources when analyzing the observed audio signal.

During pre-processing, the analytics server 102 parses the observed audio signal into audio frames containing portions of the audio data and scales the audio data embedded in the audio frames. The analytics server 102 further parses the audio frames into overlapping sub-frames. The frames may be portions or segments of the observed audio signal having a fixed length across the time series, where the length of the frames may be pre-established or dynamically determined. The sub-frames of a frame may have a fixed length that overlaps with adjacent sub-frames by some amount across the time series. For example, a one-minute observed audio signal could be parsed into sixty frames with a one-second length. Each frame may be parsed into four 0.25 sec sub-frames, where the successive sub-frames overlap by 0.10 sec.

The analytics server 102 may transform the audio data into a different representation during pre-preprocessing. The analytics server 102 initially generates and represents the observed audio signal, frames, and sub-frames according to a time domain. The analytics server 102 transforms the sub-frames (initially in the time domain) to a frequency domain or spectrogram representation, representing the energy associated with the frequency components of the observed audio signal in each of the sub-frames, thereby generating a transformed representation. In some implementations, the analytics server 102 executes a Fast-Fourier Transform (FFT) operation on the sub-frames to transform the audio data in the time domain to the frequency domain. For each frame (or sub-frame), the analytics server 102 performs a simple scaling operation so that the frame occupies the range [−1, 1] of measurable energy.

In some implementations, the analytics server 102 may employ a scaling function to accentuate aspects of the speech spectrum (e.g., spectrogram representation). The speech spectrum, and in particular the voiced speech, will decay at higher frequencies. The scaling function beneficially accentuates the voiced speech. The analytics server 102 may perform an exponentiation operation on the array resulting from the FFT transformation. An example of the exponentiation operation performed on the array (Y) may be given by $Ye=Y^{\alpha}$, where $\alpha$ is the exponentiation parameter. The values of the exponentiation parameter may be any value greater than zero and less than or equal to one (e.g., $\alpha=0.3$).

In some instances, the audio includes synthetic speech including a watermark, the synthetic speech generated by the TTS system 120. The analytics system 101 can apply the keys used to generate the synthetic speech to the audio to detect the watermark and extract metadata from the watermark. Applying the keys to detect the watermark may include executing one of multiple watermarking processes (e.g., algorithm) for analyzing the audio and detecting synthetic speech. Applying the keys to detect the watermark may operate to quickly and efficiently detect synthetic speech generated by the TTS system 120 or any other TTS system in communication with the analytics system 101.

The TTS server 122 of the TTS system 120 may be any computing device comprising one or more processors and software, and capable of performing the various processes and tasks described herein. The TTS server 122 may host or be in communication with the TTS database 124 and may generate synthetic speech. The TTS server 122 may provide the synthetic speech to the user devices 114 and provide information regarding the synthetic speech (e.g., keys, metadata) to the analytics system 101. Although FIG. 1 shows only a single TTS server 122, it should be appreciated that, in some embodiments, the TTS server 122 may include any number of computing devices. In some cases, the computing devices of the TTS server 122 may perform all or sub-parts of the processes and benefits of the TTS server 122. The TTS server 122 may comprise computing devices operating in a distributed or cloud computing configuration and/or in a virtual machine configuration.

The presence of the watermark and/or the metadata extracted from the watermark by the analytics server 102, will be forwarded to or otherwise referenced by one or more downstream applications to perform various types of audio and voice processing operations. The downstream applications may be executed by the provider server 111, the analytics server 102, the admin device 103, the agent device 116, or any other computing device. Non-limiting examples of the downstream applications or operations may include speaker verification, speaker recognition, speech recognition, voice biometrics, audio signal correction, or degradation mitigation (e.g., dereverberation), and the like.

The provider server 111 of a service provider system 110 executes software processes for managing a call queue and/or routing calls made to the service provider system 110, which may include routing calls to the appropriate agent devices 116 based on the caller's comments, such as the agent of a call center of the service provider. The provider server 111 can capture, query, or generate various types of information about the call, the caller, and/or the calling device 114 and forward the information to the agent device 116, where a graphical user interface on the agent device 116 is then displayed to the call center agent containing the various types of information. The provider server 111 also transmits the information about the inbound call to the call analytics system 101 to perform various analytics processes, including the observed audio signal and any other audio data. The provider server 111 may transmit the information and the audio data based upon a preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The analytics database 104 and/or the provider database 112 may contain any number of corpora that are accessible to the analytics server 102 via one or more networks. The analytics server 102 may access a variety of corpora to retrieve clean audio signals, previously received audio signals, recordings of background noise, and acoustic impulse response audio data. The analytics database 104 and/or provider database 112 may contain any number of corpora that are accessible to the analytics server 102 via one or more networks. The analytics database 104 may also query an external database (not shown) to access a third-party corpus of clean audio signals containing speech or any other type of training signals (e.g., example noise). In some implementations, the analytics database 102 and/or the provider database 112 may be queried, referenced, or otherwise used by components (e.g., analytics server 102) of the system 100 to assist with configuring or otherwise establishing performance limits on watermarking in relation to audio and/or speech quality (as in examples described in FIGS. 6-7).

The analytics database 104 and/or the provider database 112 may store information about speakers or registered callers as speaker profiles. A speaker profile is data files or database records containing, for example, audio recordings of prior audio samples, metadata and signaling data from prior calls, a trained model or speaker vector employed by the neural network, and other types of information about the speaker or caller. The analytics server 102 may query the profiles when executing the neural network and/or when executing one or more downstream operations. The profile could also store the registered feature vector for the registered caller, which the analytics server 102 references when determining a similarity score between the registered feature vector for the registered caller and the feature vector generated for the current caller who placed the inbound phone call.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or service provider system 110 and to issue queries and instructions to such components.

The agent device 116 of the service provider system 110 may allow agents or other users of the service provider system 110 to configure operations of devices of the service provider system 110. For calls made to the service provider system 110, the agent device 116 receives and displays some or all of the relevant information associated with the call routed from the provider server 111.

Figure 2:
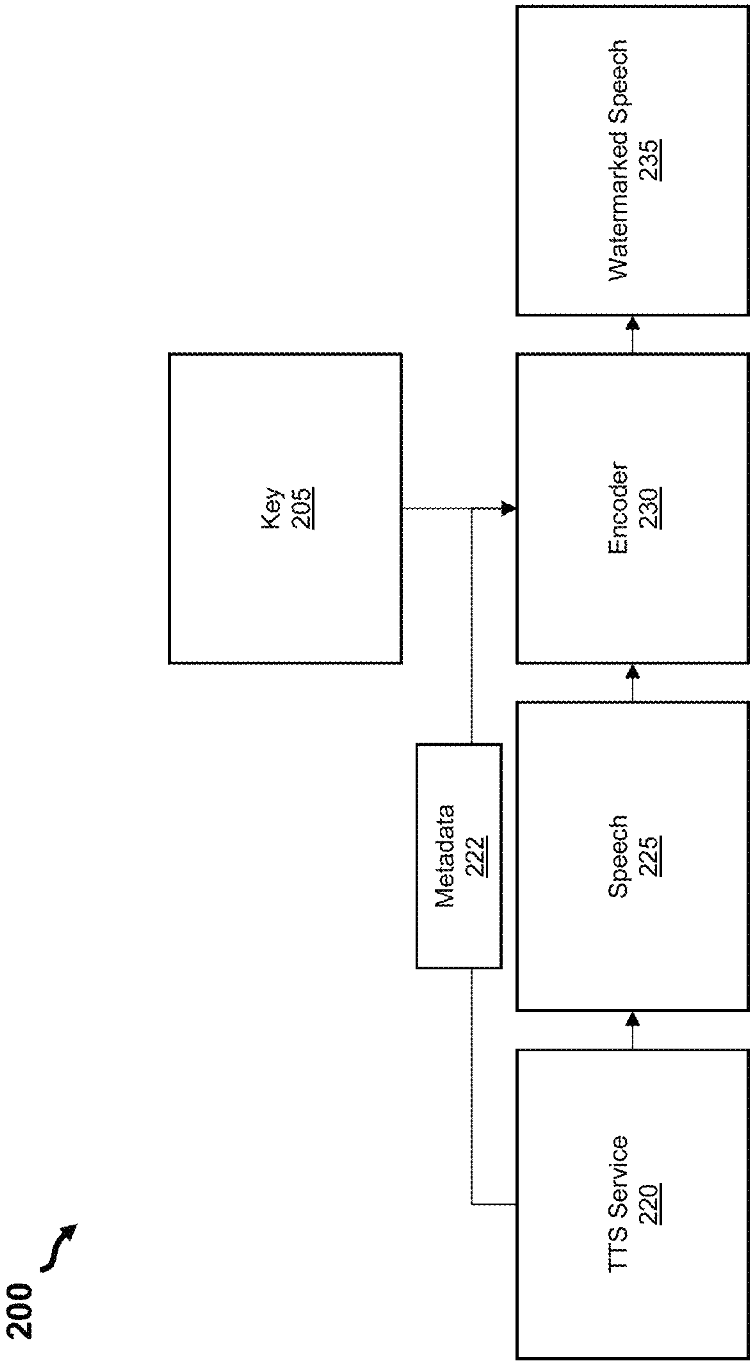
FIG. 2 is a block diagram of an example system for adding watermarks to synthetic speech, according to an embodiment.

FIG. 2 is a block diagram of an example system 200 for adding watermarks to synthetic speech. The system 200 includes one or more TTS services 220. The TTS service 220 may generate speech 225 (i.e., synthetic speech, generated speech) based on text. The TTS service 220 may receive as input text and output the speech 225. In some implementations, the TTS service 220 uses a set of algorithms to generate the speech 225 based on the text. In some implementations, the TTS service 220 uses one or more machine-learning algorithms to generate the speech 225 based on the text. In some implementations, the TTS 220 uses a combination of algorithms and machine-learning algorithms to generate the speech 225 based on the text. The TTS service 225 may generate metadata 222 associated with the speech 225. The metadata 222 may include information regarding the speech 225, such as a time the speech 225 was generated (e.g., timestamp indicating when the synthetic speech was generated), the text used to generate the speech 225, a user who requested the speech 225 (e.g., user identifier), a device the user used to request the speech 225, an account of the user, a content of the speech 225, a machine-learning model used to generate the speech 225 (e.g. identifier of a TTS model), and other data identifying and/or describing the speech 225. The speech 225, the metadata 222, and a key 205 may be provided to an encoder 230. The encoder 230 may generate a watermark based on the metadata 222 and the key 205 and add the watermark to the speech to obtain watermarked speech 235. The watermarked speech 235 may be indistinguishable from the speech 225 (e.g., a person cannot hear a difference between the watermarked speech 235 and the speech 225, a representation of the watermarked speech 235 looks the same as or similar to a representation of the speech 225). The watermark may be any audio watermark, such as a spectral watermark, a temporal watermark, or a spectral-temporal watermark. In an example, the watermarked speech 235 may be obtained by modifying a spectral representation of the speech 225 using the watermark. In an example, the watermarked speech 235 may be obtained by modifying a temporal representation of the speech 225.

The watermark may include all or some of the metadata 222. The watermark may be encoded in the watermarked speech 235 using the key 205. The watermark may be imperceptible without the key 205. The key 205 may be required for extracting the encoded metadata 222 from the watermarked speech 235. In this way, the presence of the watermark can be detected using the key 205, and the need for the key 205 for decoding prevents modification or removal of the watermark.

In some implementations, the encoder 230 is part of the TTS service 220. In some implementations, the encoder is part of an analysis service, such as the analytics system 101 of FIG. 1. In an example, the TTS service 220 generates the speech 225 and the metadata 222 and sends the speech 225 and the metadata 222 to the analysis service for encoding the metadata in the speech 225 using the key 205 to obtain the watermarked speech 235. In this way, the TTS service 220 does not receive the key 205 and the watermark is safe from tampering by the TTS service 220. In an example, the TTS 220 receives the key 205 from the analysis service for encoding the metadata in the speech 225 using the key 205 to obtain the watermarked speech 235. The key 205 may be unique to the speech 225. The key 205 may be unique to the TTS service 220. In some implementations, the analysis service is a centralized watermark service that generates watermarks for speech generated by a plurality of TTS services including the TTS service 220. The analysis service may generate a plurality of keys for watermarking the speech generated by the plurality of TTS services.

Figure 3:
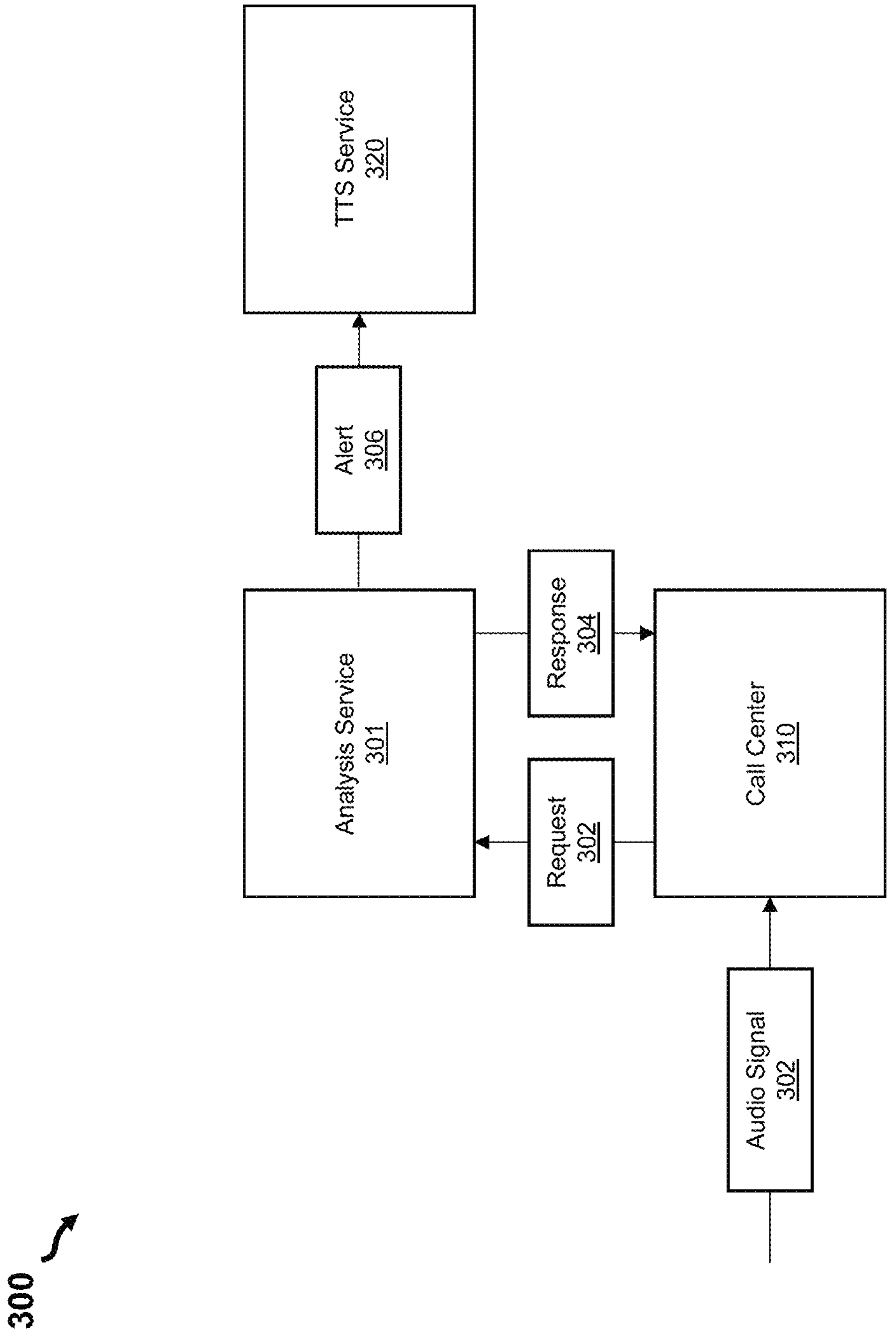
FIG. 3 is an example system for identifying synthetic speech in an audio signal, according to an embodiment.

FIG. 3 is an example system 300 for identifying synthetic speech in an audio signal. The system 300 includes an analysis service 301, a call center 310, and a TTS service 320. It should be appreciated that the embodiments described herein, including the example system 300, should be not be limited to instances of monitoring or protecting call centers. Potential embodiments could be applied to or implemented by various end-user devices or organizational systems in order to, for example, monitor or protect such end-user devices or organizational systems. The analysis service 301 may be the analytics system 101 of FIG. 1 and/or the analysis service discussed in conjunction with FIG. 2. The TTS service 320 may be the TTS service 220 of FIG. 2. The call center 310 may be an example of the service provider system 110 of FIG. 1. The analysis service 301 may include various combinations of hardware and software components such as servers, databases, and/or admin devices executing instructions in non-transitory, computer-readable media to implement various software-implemented functions. The call center 310 may include various combinations of hardware and software components such as servers, databases, and/or admin devices executing instructions in non-transitory, computer-readable media to implement various software-implemented functions. In some embodiments, the analysis service 301 is implemented using hardware components of the call center 310. In an example, the analysis service 301 is implemented in software executed on computing devices of the call center 310. The TTS service 320 may include various combinations of hardware and software components such as servers, databases, and/or admin devices executing instructions in non-transitory, computer-readable media to implement various software-implemented functions. In some embodiments, the TTS service 320 is implemented using hardware components of the call center 310. In an example, the TTS service 320 is implemented in software executed on computing devices of the call center 310. It should also be appreciated that embodiments may include or otherwise implement any number of devices capable of performing the various features and tasks described herein.

The call center 310 receives an audio signal 320. The audio signal 320 may be an audio signal of a phone call for authentication purposes. In an example, the audio signal 320 is part of a phone call for verifying a person's identity for a banking service where the person's voice is used to verify the person's identity. The call center 310 may send a request 302 to the analysis service 301 to determine whether the audio signal 302 includes synthetic speech. The request 302 may include the audio signal 302 or a portion of the audio signal 302. The analysis service 301 determines whether the audio signal 302 includes synthetic speech generated by the TTS service 320 by applying a key to the audio signal 302, such as the key 205 of FIG. 2. In some implementations, the analysis service 301 uses a single key for generating watermarks for speech generated by the TTS service 320. In this case, the analysis service 301 is able to determine whether the audio signal 302 includes speech generated by the TTS service 320 by applying the single key to the audio signal 302. In some implementations, the analysis service 301 uses a set of keys for generating watermarks for speech generated by the TTS service 320. In this case, the analysis service 301 is able to determine whether the audio signal 302 includes speech generated by the TTS service 320 by applying the set of keys to the audio signal 302. In some implementations, the analysis service 301 uses multiple sets of keys for generating watermarks for multiple TTS services. In this case, the analysis service 301 is able to determine whether the audio signal 302 includes speech generated by the multiple TTS services (and by which particular TTS service) by applying the multiple sets of keys to the audio signal 302. In some implementations, the analysis service 301 uses a random key from a set of keys for watermarking speech, such that metadata of the watermark must be extracted to identify the origin of the synthetic speech. In some implementations, correlating the key with the origin of the synthetic speech is part of extracting metadata from the watermark.

If the analysis service 301 detects a watermark corresponding to synthetic speech generated by the TTS service 320 (or another TTS service), the analysis service 301 can extract metadata from the watermark. The metadata can include characteristics of the synthetic speech and/or the generation of the synthetic speech, similar to the metadata 222 of FIG. 2. In some implementations, the metadata indicates an origin of the synthetic speech (e.g., indicates that the audio signal 302 includes synthetic speech generated by the TTS service 320).

If the analysis service 301 does not detect a watermark corresponding to synthetic speech, the analysis service 301 can determine that the audio signal 302 does not include synthetic speech and/or apply various other analytic methods to determine whether the audio signal 302 includes synthetic speech. In an example, the analysis service 301 determines that the audio signal 302 does not include a watermark corresponding to synthetic speech and then applies one or more machine-learning architectures to generate output indicating whether the audio signal 302 includes synthetic speech.

The analysis service 301 sends a response 304 to the call center 310. The response 304 can be sent to the call center 310 in response to the request 302 and/or the determination by the analysis service 301 as to whether the audio signal 302 includes synthetic speech. In an example, the response 304 includes an indication that the audio signal 302 includes or does not include synthetic speech. In an example, the response 304 includes a confidence score regarding whether the audio signal 302 includes synthetic speech. In some implementations, the response 304 includes a portion of the metadata. In an example, the response 304 includes an identification of the TTS service 302.

The analysis service 301 may generate an alert 306 to send to the TTS service 320. The alert 306 may inform the TTS service 320 that synthetic speech generated by the TTS service 320 was used in an authentication attempt. The alert 306 may include an indication of a severity of the attempt and/or a type of attempt. In an example, the alert 306 may indicate that the authentication attempt was associated with a financial account. In an example, the alert 306 may indicate that the authentication attempt represents an attempted crime or fraud. The alert 306 may indicate a user or account of the TTS service 320 that was used to generate the synthetic speech. In an example, the alert 306 includes a user ID of a user of the TTS service 320. In this way, the TTS service 320 can identify malicious users of the TTS service 320 to ban or otherwise restrict activity of the malicious users.

The TTS service 320 may comply with a watermarking standard defined and/or enforced by the analysis service 301. The watermarking standard may include requirements for watermarks to be present in synthetic speech, robustness thresholds for the watermarks, and/or key sharing for identification and/or decoding of the watermarks. In an example, the analysis service 301 provides compliance with the watermarking standard to the TTS service 320 by using a key to add a watermark to synthetic speech generated by the TTS service 320. In an example, the TTS service sends watermarked speech and a key used to generate the watermarked speech to the analysis service 301 to verify that the watermarked speech complies with the watermarking standard and to provide the analysis service 301 with the key to allow the analysis service 301 to detect the watermark. In this way, synthetic speech can be detected, and an origin of the synthetic speech can be detected.

Figure 4:
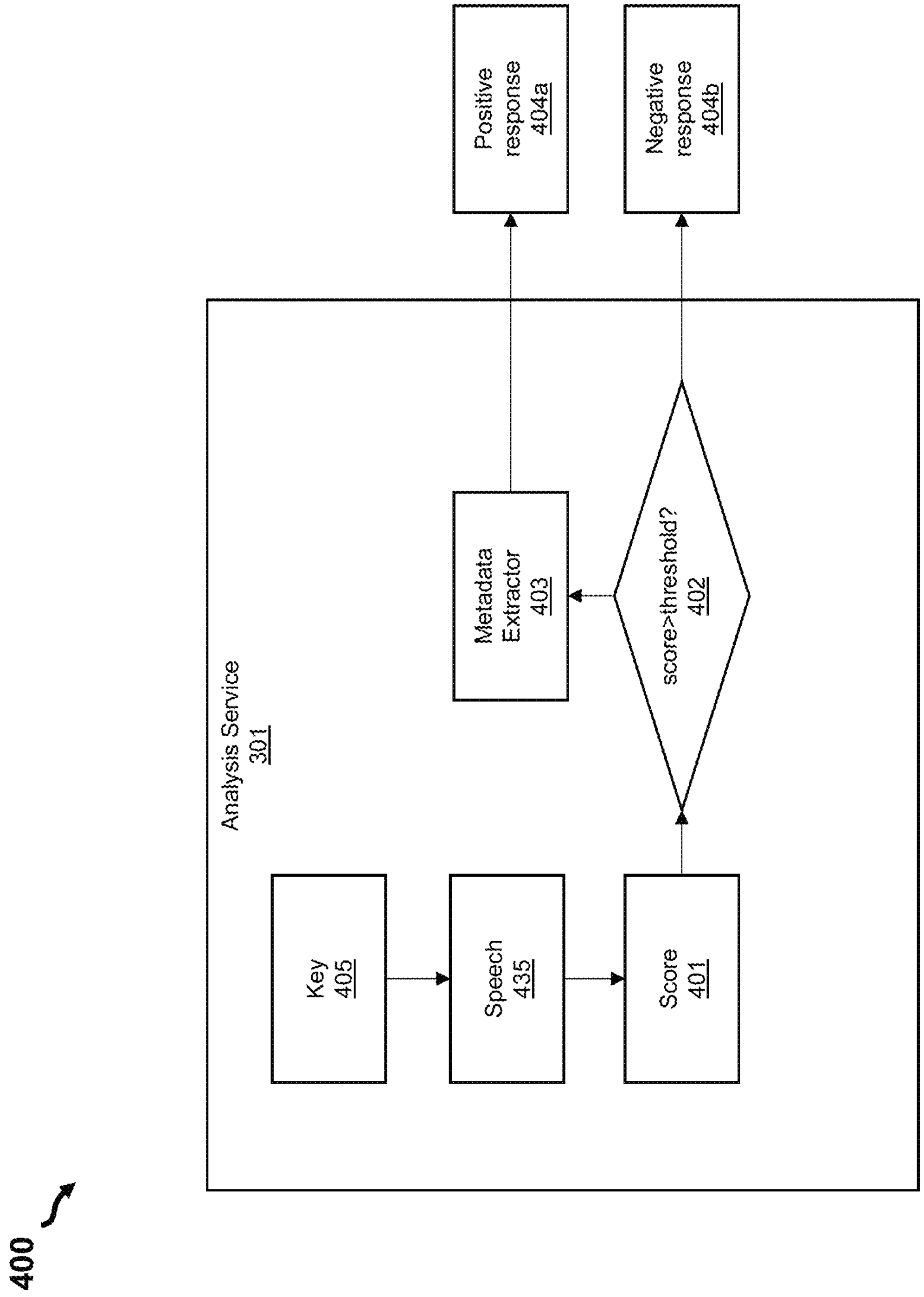
FIG. 4 shows details of the analysis service of FIG. 3, according to the embodiment.

FIG. 4 shows details of the analysis service 301 of FIG. 3. As discussed above, the analysis service 301 may include various combinations of hardware and software components. In an example, the analysis service 301 is implemented as software executed on a server of the call center 310. In an example, the analysis service 301 includes one or more processors and a memory including a non-transitory, computer-readable medium including instructions that when executed by the one or more processors, cause the one or more processors to perform operations as described herein.

The analysis service 301 applies a key 405 to speech 435. The speech 435 may be speech included in the audio signal 302 of FIG. 3. The speech 435 may or may not include a watermark corresponding to synthetic speech. The analysis service 301 generates a score 401 corresponding to whether the speech 435 includes a watermark. In some implementations, the score includes a correlation between the key 405 and a representation of the speech 435 where the watermark sequence, if present, was embedded. In an example, the score includes a correlation between a representation of the key 405 and a temporal representation of the speech 435. In an example, the score includes a correlation between a representation of the key 405 and a spectral representation of the speech 435. The score 401 generally indicates whether the watermark is present in (at least a portion of) the speech 435.

The analysis service 301 executes a determination operation 402 that determines whether the score 401 satisfies a threshold. The threshold may be a predetermined threshold for determining whether audio includes synthetic speech including a watermark. In some implementations, the threshold is a correlation threshold. In an example, the threshold is a correlation of 0.9, such that the analysis service 301 determines that the speech 435 includes a watermark corresponding to synthetic speech if the speech 435 has a correlation of 0.9 or above with the key 405 and the analysis service 301 determines that the speech 435 does not include a watermark corresponding to synthetic speech if the speech 435 has a correlation below 0.9 with the key 405. As discussed herein, the analysis service 301 may use a plurality of keys for generation and/or detection of watermarks. The analysis service 301 may generate a plurality of scores for the plurality of keys (i.e., one score per key applied to an audio signal).

If the score 401 is above the threshold, the analysis service extracts metadata of the watermark using a metadata extractor 403. The analysis service 301 generates a positive response 404*a* indicating that the speech 435 includes a watermark corresponding to synthetic speech, or that the speech 435 is synthetic speech. The positive response 404*a* may include a portion of the metadata, as discussed in conjunction with FIG. 3.

If the score 401 is below the threshold, the analysis service may generate a negative response 404*b* indicating the speech 435 does not include a watermark corresponding to synthetic speech. As discussed herein, the analysis service 301 may perform other analyses on the speech 435 if the score is below the threshold to determine whether the speech 435 includes synthetic speech. In an example, the analysis service 301, in response to the score 401 being below the threshold, applies a machine-learning architecture configured to identify synthetic speech to the speech 435.

The analysis service 301 may perform additional analysis on the speech 435 to generate the positive response 404*a* or the negative response 404*b* and/or perform additional analysis on the speech after generating the positive response 404*a* or the negative response 404*b*. In an example, the analysis service 301 may determine whether the speech 435 is recorded speech in response to determining that the speech 435 does not include synthetic speech. In this way, the determination of whether the speech 435 includes synthetic speech is part of a larger analysis as to whether the speech 435 can be used to authenticate a person or whether the speech 435 is part of a malicious attack to impersonate the person. Similarly, the generation of the score 401 and the comparison of the score 401 can be part of a larger analysis of whether the speech 435 includes synthetic speech, as discussed herein.

Figure 5:
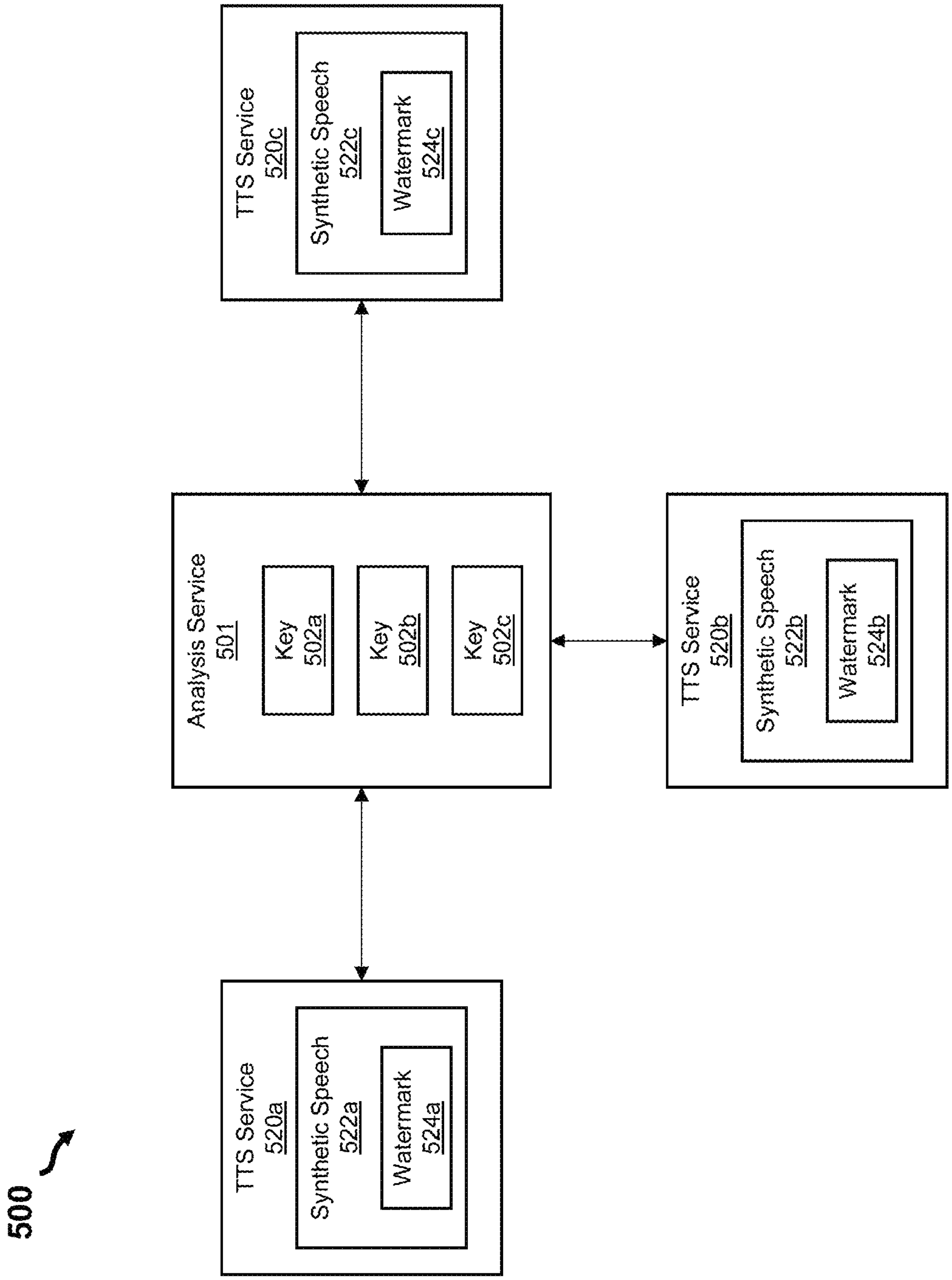
FIG. 5 is an example system for centralized provisioning of watermarks for synthetic speech, according to an embodiment.

FIG. 5 is an example system 500 for centralized provisioning of watermarks for synthetic speech. The system 500 may be similar to the system 300 of FIG. 3, with an analysis service 501 providing centralized provisioning of watermarks for synthetic speech for a plurality of TTS services 520. The plurality of TTS services 520 may include a first TTS service 520*a*, a second TTS service 520*b*, and a third TTS service 520*c*, as shown. The plurality of TTS services 520 may include any number of TTS services. The analysis service 501 may include various combinations of hardware and software components such as servers, databases, and/or admin devices executing instructions in non-transitory, computer-readable media to implement various software-implemented functions. The plurality of TTS services 520 may include various combinations of hardware and software components such as servers, databases, and/or admin devices executing instructions in non-transitory, computer-readable media to implement various software-implemented functions. In some embodiments, the analysis service 501 is implemented using hardware components of the plurality of TTS services 520. In an example, the analysis service 501 is implemented in different software instances executed on respective computing devices of the plurality of TTS services 520. It should also be appreciated that embodiments may include or otherwise implement any number of devices capable of performing the various features and tasks described herein.

The analysis service 501 may store a plurality of keys 502 including a first key 502*a*, a second key 502*b*, and a third key 502*c*. The analysis service 501 may use the plurality of keys 502 for encoding watermarks in synthetic speech generated by the plurality of TTS services 520. As discussed above, the plurality of keys 502 may each be used to encode watermarks in speech generated by a single TTS service, by multiple TTS services, and/or in a single instance of synthetic speech. In the illustrated example, the first key 502*a* corresponds to a first watermark 524*a* encoded in first synthetic speech 522 generated by the first TTS service 520*a*, the second key 502*b* corresponds to a second watermark 524*b* encoded in second synthetic speech 522*b* generated by the second TTS service 520*b*, and the third key 502*c* corresponds to a third watermark 524*c* encoded in third synthetic speech 522*c* generated by the third TTS service 520*c*.

Using the plurality of keys 502, the analysis service 501 is able to detect the watermarks 524 (the first watermark 524*a*, the second watermark 524*b*, the third watermark 524*c*) and extract metadata of the watermarks 524, as discussed herein. In this way, the analysis service 501 is able, using the stored plurality of keys 502, identify synthetic speech generated by the plurality of TTS service 520. In some implementations, the plurality of TTS services 520*a* send the synthetic speech 522 (the first synthetic speech 522*a*, the second synthetic speech 522*b*, the third synthetic speech 522*c*) to the analysis service 501 for the analysis service to encode the watermarks 524 in the synthetic speech 522. In an example, the first TTS service 520*a* generates the first synthetic speech 522*a*, the first TTS service 520*a* sends the first synthetic speech 522*a* to the analysis service 501, the analysis service 501 encodes the first watermark 524*a* in the first synthetic speech 522*a*, and the analysis service 501 sends the first synthetic speech 522*a* including the first watermark 524 to the TTS service 520*a*.

In some implementations, the analysis service 501 generates the watermarks 524 and sends the watermarks to the plurality of TTS services 520 for the plurality of TTS services 520 to encode the watermarks 524 in the synthetic speech 522. In an example, the second TTS service 520*b* requests a watermark for the second synthetic speech 522*b*, the analysis service 501 generates the second watermark 524*b* and sends the second watermark 524*b* to the second TTS service 520*b*, and the second TTS service 520*b* encodes the second watermark 524*b* in the second synthetic speech 522*b*.

In some implementations, the plurality of TTS services 520 generate the watermarks 524, encode the watermarks 524 in the synthetic speech 522, and send the plurality of keys 502 to the analysis service 501.

As discussed herein, the analysis service 501 may define and enforce a watermarking standard for the watermarks 524. In an example, the analysis service 501 generates the plurality of keys 502 such that the watermarks 524 comply with the watermarking standard. In an example, the analysis service 501 approves or rejects keys and/or watermarks from the plurality of TTS services 520 to ensure that the watermarks comply with the watermarking standard. The watermarking standard may include watermark criteria such as robustness to degradation, robustness to attack, and perceptibility.

The plurality of TTS services 520 may provide the synthetic speech 522 including the watermarks 524 to customers of the plurality of TTS services 520. The watermarks 524 and the stored plurality of keys 502 allow the analysis service 501 to detect the synthetic speech 522. In an example, the analysis service 501 can identify when the synthetic speech 522 is used in a voice authentication attempt, as discussed in conjunction with FIG. 3. In this example, the analysis service 501 applies the stored plurality of keys 502 to the first synthetic speech 522 to detect the first watermark 524*a* (the first key 502*a* used to successfully detect the watermark 524*a*) and extract metadata of the first watermark 524*a*, the metadata identifying the first TTS service 520*a* as the origin of the first synthetic speech 522*a*.

Figure 6:
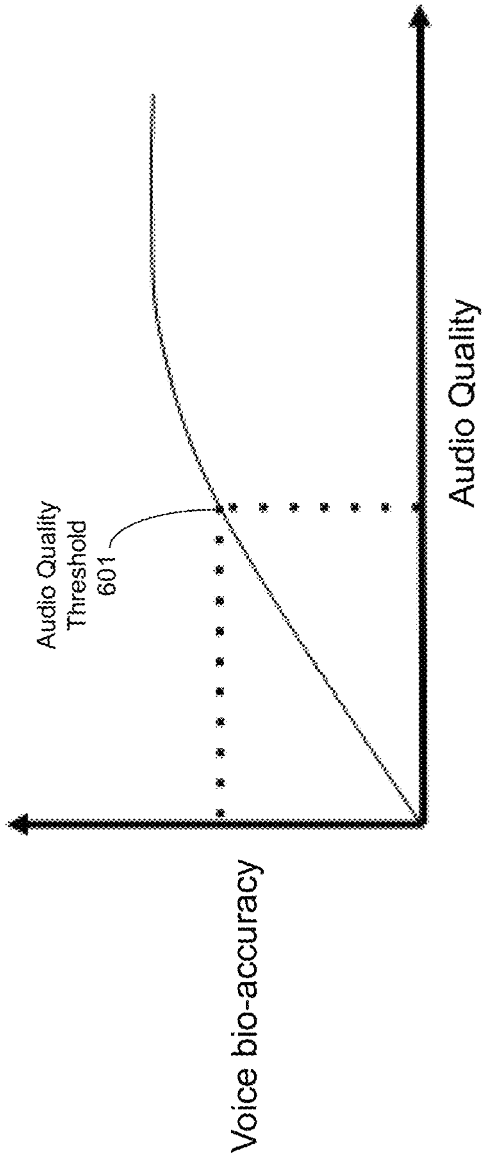
FIG. 6 is an example graph including a quality threshold for audio and/or speech for watermarks, according to an embodiment.

FIG. 6 is an example graph 600 including an audio quality threshold 601 of audio and/or speech for watermarks, where an audio quality assessment and the audio quality threshold 601 may take into consideration the quality of the audio and/or the input speech. The audio quality threshold 601 may be one or more criteria for watermarks of the watermarking standard, as discussed herein. The audio quality threshold 601 may correspond to a robustness to degradation. During phone calls, background noise and loudspeaker-microphone interactions can change watermarked speech from its original state. Additionally, telephony channel distortions, codec process, and packet loss can additionally change watermarked speech. These various forms of degradation may change or modify the watermarked speech such that the watermark is not fully present in the audio signal received at the receiver side of a phone call (e.g., at a call center such as the call center 310 of FIG. 3), or the watermark is degraded when the audio signal is received at the receiver side of the phone call. The level of degradation can be quantified as a single audio-quality score. The audio quality threshold 601 requires that a watermark be detectable using the corresponding key above the audio quality threshold 601. The audio quality threshold 601 may correspond to an audio quality score below which a voice is not accurate, or below which a voice cannot be used for authentication purposes. In an example, a malicious actor degrades watermarked speech in order to attempt to destroy the watermark but must degrade the speech below a level at which the speech is useful for authentication purposes in order to destroy the watermark. In this way, the watermark cannot be destroyed by degradation without rendering the speech useless for authentication purposes. The audio quality threshold 601 for watermarks may be set at any audio quality score below which a voice cannot be used for authentication purposes. In an example, the audio quality threshold 601 may be set at an audio quality score below the level at which a voice can be used for authentication purposes such that if synthetic speech is highly degraded, the watermark can still be detected. The audio quality threshold 601 may be set to balance an imperceptibility of the watermarks against a robustness of the watermarks.

As discussed herein, the analysis service (e.g., the analysis service 501 of FIG. 5, the analysis service 301 of FIG. 3, the analytics system 101 of FIG. 1) may define and enforce the watermarking standard. The analysis service can enforce the watermarking standard by generating keys and embedding the watermark in a way that complies with the audio quality threshold 601. The analysis service can enforce the watermarking standard by using a key to embed a watermark in synthetic speech such that a strength of the watermark is commensurate with a strength of the underlying synthetic speech. In an example, the analysis service may embed a watermark in synthetic speech such that the watermark cannot be obscured or destroyed without obscuring or destroying characteristics of the synthetic speech. In some implementations, the analysis service can enforce the watermarking standard by rejecting watermarks that do not comply with the audio quality threshold 601. In some implementations, the analysis service can test watermarks to ensure compliance with the audio quality threshold 601. The analysis service can provide watermarks tailored to characteristics of synthetic speech such that the watermarks comply with the audio quality threshold 601. In this way, the analysis service can adapt the embedding of watermarks to speech signals having different characteristics such as quality of speech, distinctness of speech, noise level, and other characteristics, while ensuring robustness and detectability of the watermark that complies with the audio quality threshold 601. Different synthetic speech signals may call for different levels of robustness of watermarks. In an example, the analysis service embeds a first watermark with a first level of robustness using a first key in a first synthetic speech signal based on first characteristics of the first synthetic speech such that the first watermark complies with the audio quality threshold 601 and embeds a second watermark with a second, higher level of robustness using a second key in a second synthetic speech signal based on second characteristics of the second synthetic speech such that the second watermark complies with the audio quality threshold 601. In this example, the first synthetic speech signal may have a lower audio quality or lower level of distinctness, allowing for a watermark of lower robustness to comply with the audio quality threshold 601, while the second synthetic speech signal may have a higher audio quality or higher level of distinctness, calling for a watermark of higher robustness to comply with the audio quality threshold 601.

Figure 7:
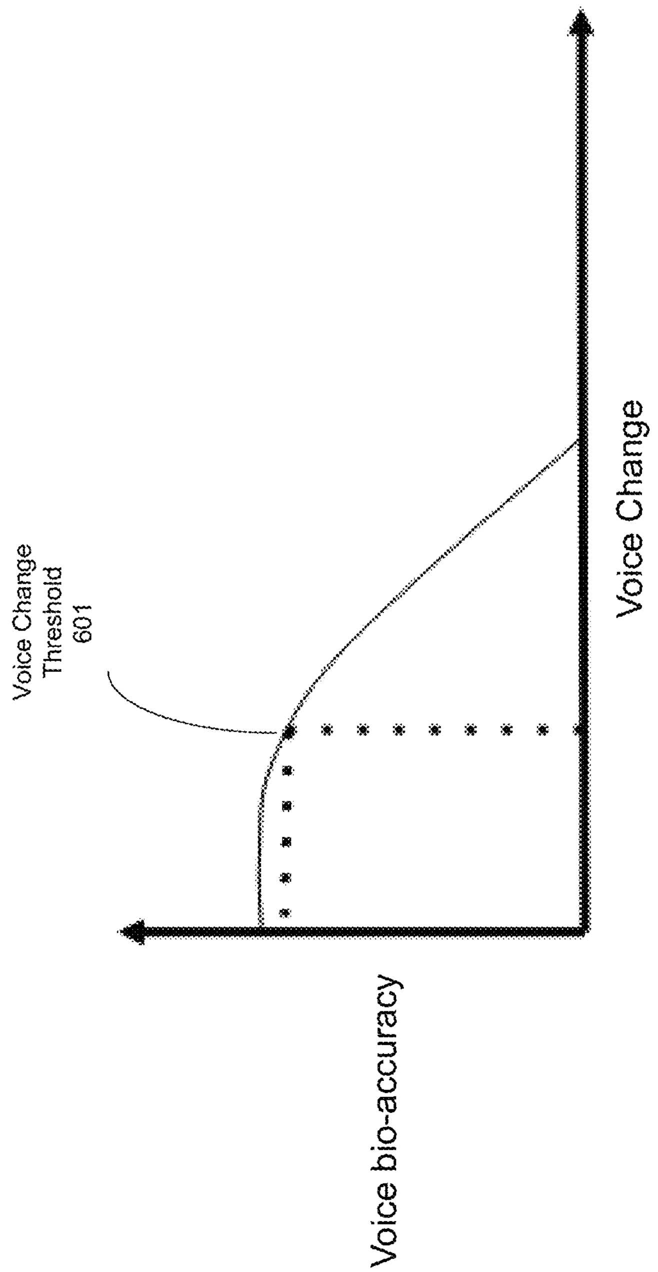
FIG. 7 is an example graph including a voice change threshold for watermarks, according to an embodiment.

FIG. 7 is an example graph 700 including a voice change threshold 701 for watermarks. Attackers can attempt to destroy watermarks by adjusting vocal characteristics of speech (e.g., tempo, pitch, etc.) without changing the quality of the audio. However, the adjusted vocal characteristics differ from the vocal characteristics of a target's voice. A degree of change from the target voice can be quantified as a vocal change score. The voice change threshold 701 may be set at or above a vocal change score above which synthetic speech is not usable for an attack, as the vocal characteristics no longer match the target voice. In this way, watermarks complying with the voice change threshold 701 cannot be destroyed without rendering the synthetic speech unusable for authentication purposes, or for attacks on voice authentication systems. In an example, vocal characteristics of synthetic speech are modified such that the watermark is destroyed, but the synthetic speech is too different from the target voice to be used in an attack. In an example, vocal characteristics of synthetic speech are modified such that synthetic speech is too different from the target voice to be used in an attack, but the watermark is still detectable, allowing the analysis service to identify an attempted attack.

The analysis service can define and enforce the voice change threshold 701 for watermarks by generating keys and embedding watermarks such that the embedded watermarks comply with the voice change threshold 701 and/or by approving watermarks complying with the voice change threshold 701, similar to how the analysis service defines and enforces the audio quality threshold 601 of FIG. 6.

Figure 8:
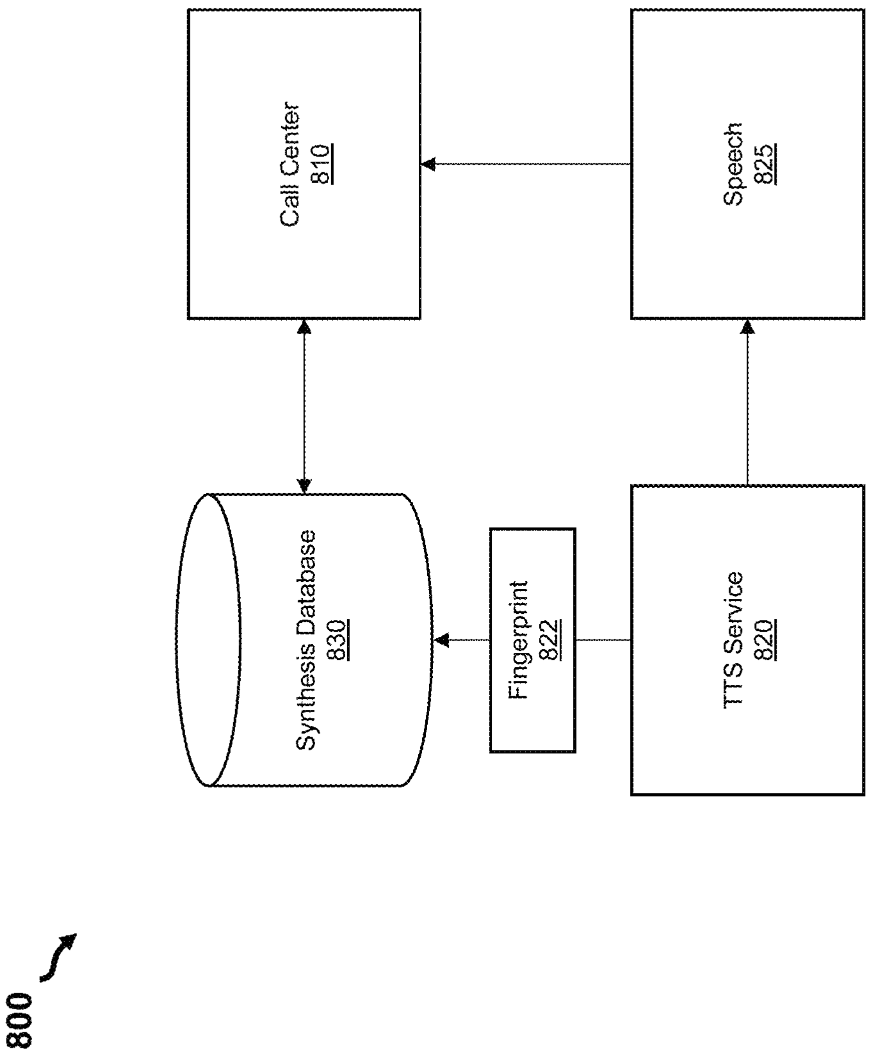
FIG. 8 is an example system for capturing metadata of synthesized speech, according to an embodiment.

FIG. 8 is an example system 800 for capturing metadata of synthesized speech 825. The system 800 includes a synthesis database 830 for storing a fingerprint 822 of the speech 825 generated by a TTS service 820. The synthesis database 830 may include various combinations of hardware and software components such as servers, databases, and/or admin devices executing instructions in non-transitory, computer-readable media to implement various software-implemented functions. In an example, the synthesis database 830 is a database configured to store data such as the fingerprint 822, the database including one or more physical storage devices for data storage and one or more processors for managing updates to the database, or updates to the data stored in the one or more physical storage devices. The TTS service 820 may include various combinations of hardware and software components such as servers, databases, and/or admin devices executing instructions in non-transitory, computer-readable media to implement various software-implemented functions. In an example, the TTS service 820 includes a plurality of databases hosted on servers, computer memory including algorithms or models for speech synthesis, and a plurality of processors for performing speech synthesis. It should also be appreciated that embodiments may include or otherwise implement any number of devices capable of performing the various features and tasks described herein.

The fingerprint 822 may include an embedding generated based on metadata of the speech 825 and/or the speech 825. The metadata 822 may include a time the speech 825 was generated (e.g., timestamp), the text used to generate the speech 825, a user who requested the speech 825 (e.g., user identifier), a device the user used to request the speech 825, an account of the user, a content of the speech 825, a machine-learning model used to generate the speech 825 (e.g. identifier of a TTS model), and other data identifying and/or describing the speech 825. The synthesis database 830 may store the fingerprint 822 for comparison with audio signals and/or fingerprints to detect synthesized speech, similar to the analysis service described herein.

A call center 810 may receive the speech 825 as part of an authentication process and send the speech 825 to the synthesis database 830. The call center 810 may include various combinations of hardware and software components such as servers, databases, and/or admin devices executing instructions in non-transitory, computer-readable media to implement various software-implemented functions. In an example, the call center 810 includes a plurality of databases to store customer information and a plurality of agent devices to interface with the plurality of databases to update customer information. The synthesis database 830 may generate a fingerprint based on the received speech and compare the fingerprint of the received speech to the stored fingerprint 822. Based on the fingerprint of the received speech matching the stored fingerprint 822, the synthesis database 830 can determine that the received speech includes synthesized speech, specifically the speech 825. The synthesis database 830 may generate a notification to the call center 810 that the received speech includes synthetic speech. The synthesis database 830 may transmit an alert to the TTS service 820 that the speech 825 was used in an authentication attempt at the call center 810.

In some implementations, the synthesis database 830 performs similar functions to the analysis system described herein. In some implementations, the synthesis database 830 is part of the analysis system described herein. The analysis system can generate a fingerprint based on received speech, compare the generated fingerprint to stored fingerprints to determine whether the generated fingerprint matches the stored fingerprints and apply keys to the received speech to determine whether the received speech includes a watermark. In this way, the analysis service can use multiple pieces of data from TTS services to detect and/or identify synthetic speech generated by the TTS services.

Figure 9:
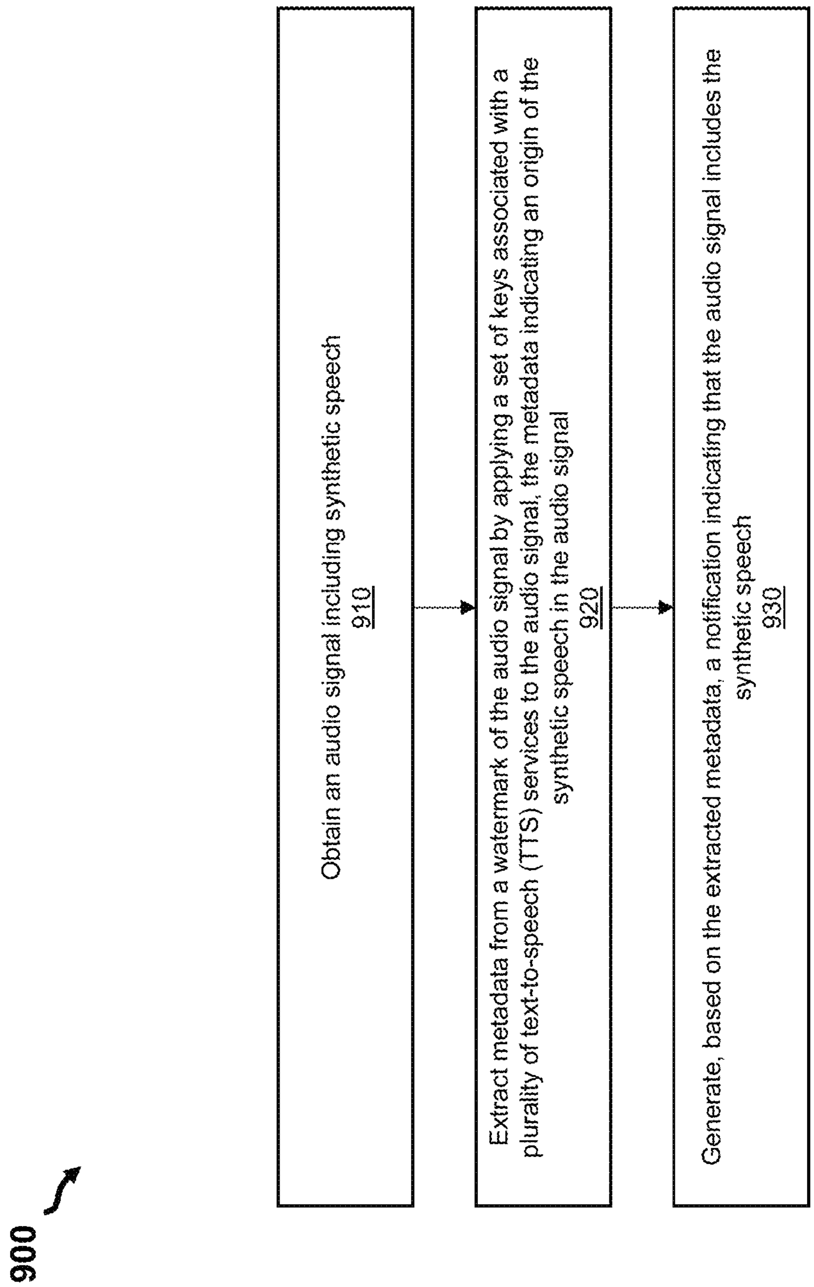
FIG. 9 illustrates example operations of a method for identifying synthetic speech in an audio signal, according to an embodiment.

FIG. 9 illustrates example operations of a method 900 for identifying synthetic speech in an audio signal. The method 900 may include more, fewer, or different operations than shown. The operations may be performed in the order shown, in a different order, and/or concurrently. The method 900 may be performed by the system 100 of FIG. 1, the system 300 of FIG. 3, and/or the system 500 of FIG. 5. The method 900 may be performed by the analytics system 101 of FIG. 1, the analysis service 301 of FIG. 3, and/or the analysis system 501 of FIG. 5.

At operation 910, an audio signal is obtained including synthetic speech. The audio signal may be obtained from a computing system requesting an indication of whether the audio signal includes synthetic speech, such as the service provider system 110 of FIG. 1 or the call center 310 of FIG. 3.

At operation 920, metadata is extracted from a watermark of the audio signal by applying a set of keys associated with a plurality of TTS services to the audio signal, the metadata indicating an origin of the synthetic speech in the audio signal. The metadata includes characteristics of the synthetic speech and/or characteristics of the generation of the synthetic speech such as an identifier of a TTS service (e.g., service identifier), an identifier of a TTS model (e.g., model identifier), an identifier of a user (e.g., user identifier) of the TTS service, and a timestamp indicating when the synthetic speech was generated.

In some implementations, the method 900 includes generating a score for each key of the set of keys to determine that the audio signal includes the watermark. The watermark may be generated using a key of the set of keys. The key used to generate the watermark may be associated with a score indicating that the audio signal includes the watermark. In some implementations, the score indicates a correlation between the key and the watermark. The generated scores are compared to a predetermined threshold (e.g., score threshold, correlation threshold) to determine whether the audio signal includes the watermark.

In some implementations, the method 900 includes transmitting the key to a TTS service to generate the watermark. The TTS service may generate the watermark and encode the watermark in the synthetic speech. In some implementations, the method 900 includes generating the watermark using the key and sending the watermark to the TTS service to encode the watermark in the synthetic speech. In some implementations, the method 900 includes generating the watermark using the key, encoding the watermark in the synthetic speech, and sending the synthetic speech with the encoded watermark to the TTS service. In some implementations, the method 900 includes verifying that the watermark complies with a watermarking standard. The key can be generated to ensure that the watermark complies with the watermarking standard. In some implementations, the method 900 includes receiving, from the origin of the synthetic speech (e.g., TTS service) an audio signal including the watermark, determining that a robustness of the watermark exceeds a predetermined threshold, and transmitting an approval of the watermark to the origin of the synthetic speech. In this way, the watermark can be verified to comply with the watermarking standard such that the watermark is detectable using the key despite audio degradation. In an example, the audio signal includes synthetic speech having a watermark, and the audio signal is degraded due to a codec used in a phone call and background noise. In this example, the watermark is still detectable using the key because the watermark complies with the watermarking standard, including the robustness threshold.

At operation 930, based on the metadata, a notification is generated indicating that the audio signal includes the synthetic speech. In some implementations, the notification includes a confidence level that the audio signal includes the synthetic speech. The confidence level may be the generated score. The notification may include a portion of the extracted metadata. In some embodiments, the notification indicates the origin of the synthetic speech. In some embodiments, the notification indicates a timestamp of when the synthetic speech was generated. In an example, the notification indicates that the audio signal most likely includes synthetic speech generated one month ago. The notification can be displayed to a user and/or sent to a computing device that requested analysis of the audio signal to determine whether the audio signal includes synthetic speech. In an example, the notification is sent to a call center that provided the audio signal and requested to know whether the audio signal includes synthetic speech.

In some implementations, the watermark includes a consent watermark and the notification indicates usage consent parameters of the consent watermark. The consent watermark may indicate whether consent is provided for synthesis of speech using audio. The usage consent parameters may indicate whether audio is allowed to be copied, transmitted, and/or used for synthesis. In an example, the consent watermark is included in audio and indicates that the audio cannot be used for TTS. In this example, inclusion of the consent watermark in the synthetic speech indicates that the synthetic speech was generated without consent. In this example, the notification may indicate to the TTS service that the synthetic speech is unauthorized so the TTS service can determine to not deliver the synthetic speech to a user. In an example, a user of the TTS service uploads audio including the consent watermark indicating that the audio cannot be used for TTS, the TTS service generates synthetic speech using the audio, sends the synthetic speech to the analysis service, and receives the notification that the synthetic speech is unauthorized. In an example, a user of the TTS service uploads audio including the consent watermark indicating that the audio cannot be used for TTS, the TTS service sends the audio to the analysis service and receives the notification that the audio cannot be used for generating synthetic speech.

In some implementations, the watermark includes an authorization watermark, and the notification indicates authorization parameters of the authorization watermark. The authorization watermark can indicate ownership and/or usage authorization for audio. In an example, the authorization watermark indicates an identity of an individual whose voice is present in audio or whose voice was used to generate synthetic speech. The authorization parameters may define when, how, and by whom the audio can be used. In some implementations, the authorization watermark indicates that the TTS service owns the synthetic speech and that the synthetic speech is authorized for commercial, educational, or artistic purposes, but not for impersonation. In an example, the authorization watermark is present in audio used to generate the synthetic speech and the TTS encodes the authorization watermark from the audio in the synthetic speech to indicate that the synthetic speech was properly authorized. In some implementations, the authorization watermark indicates that synthetic speech is authorized for identity verification purposes. The authorization watermark can be referred to as a legitimate-synthesis watermark in this context, indicating that the synthetic speech was generated with the consent and intention of the person whose voice is used to generate the synthetic speech. In an example, an individual with a condition that causes voice loss may record their voice for purposes of generating synthetic speech and then use the synthetic speech for voice authentication. In this example, the authorization watermark (e.g., legitimate-synthesis watermark) indicates that despite being synthetic speech, the synthetic speech can be used for voice authentication.

In some implementations, the method 900 includes transmitting an alert to a TTS service based on the origin of the synthetic speech in the audio signal. In some embodiments, the notification may include the alert. The alert may be generated based on the synthetic speech being used to attempt to commit fraud, a crime, or to impersonate a person. In an example, the alert may be generated based on the synthetic speech being used to impersonate a person for voice authentication. The alert may be transmitted to a TTS service that is the origin of the synthetic speech, or which generated the synthetic speech. In this way, the TTS service can be notified of improper use of the synthetic speech. In an example, the alert notifies the TTS service of improper use of synthetic speech generated by a user of the TTS service, allowing the TTS service to sanction the user.

As discussed herein, particularly in conjunction with FIG. 5, a plurality of audio signals can be received, and the set of keys applied to identify synthetic speech from a plurality of TTS services. In an example, the method 900 includes obtaining, by the computer, a second audio signal including second synthetic speech, extracting, by the computer, second metadata from a second watermark of the second audio signal, the second metadata indicating a second origin of synthetic speech different from the first origin, and generating, by the computer, a second notification indicating that the second audio signal includes the second synthetic speech. In this way, different synthetic speech generated by different TTS services of the plurality of TTS service can be detected using the set of keys associated with the plurality of TTS services.

Figure 10:
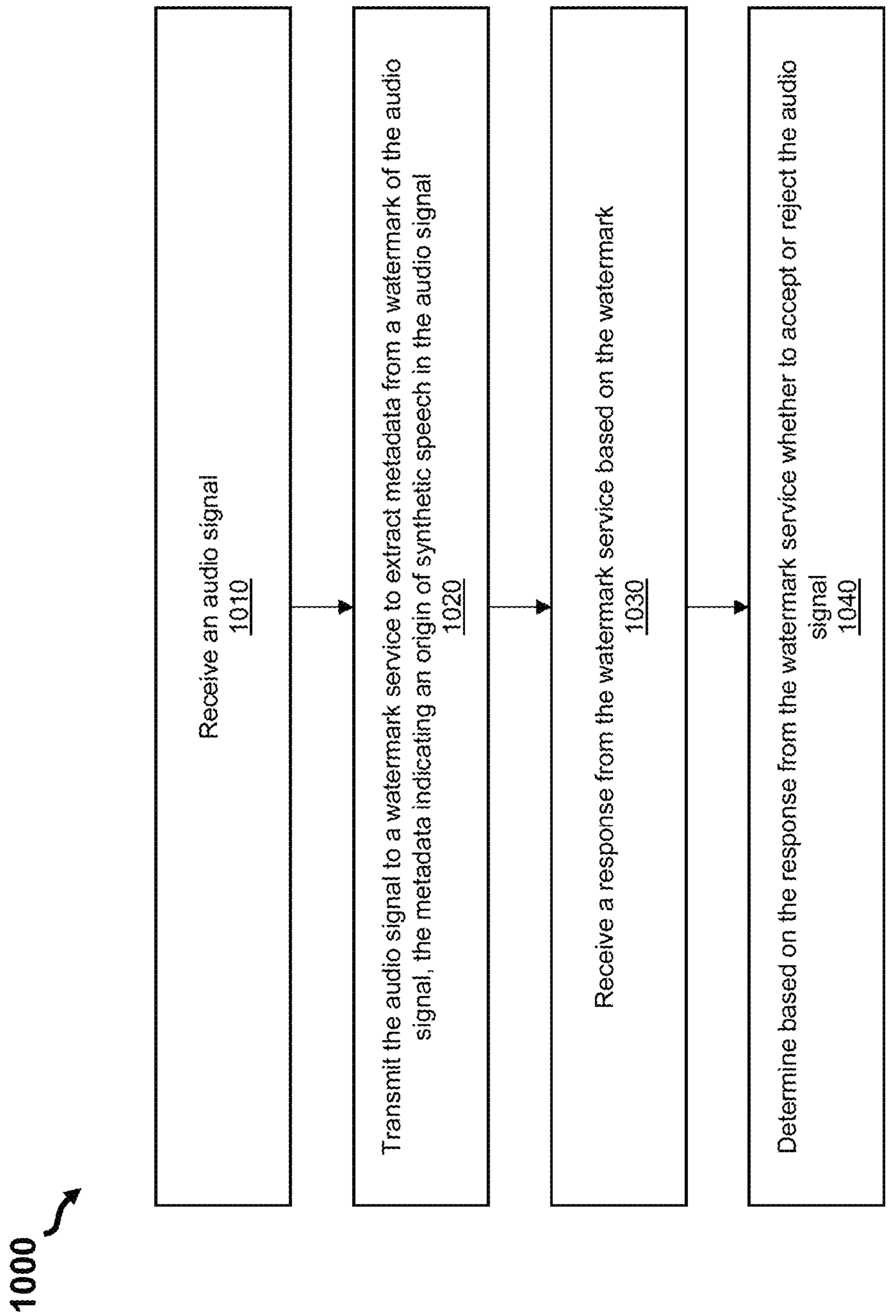
FIG. 10 illustrates example operations of a method for identifying synthetic speech in an audio signal using a centralized watermark service, according to an embodiment.

FIG. 10 illustrates example operations of a method for identifying synthetic speech in an audio signal using a centralized watermark service. The method 1000 may include more, fewer, or different operations than shown. The operations may be performed in the order shown, in a different order, and/or concurrently. The method 1000 may be performed by the system 100 of FIG. 1, the system 300 of FIG. 3, and/or the system 500 of FIG. 5. The method 1000 may be performed by the service provider system 110 of FIG. 1 and/or the call center 310 of FIG. 3.

At operation 1010, an audio signal is received. The audio signal may be received as part of an authorization process. In an example, the audio signal is received as part of a voice authorization process where an identity of a person is verified using the person's voice.

At operation 1020, the audio signal is transmitted to a watermark service to extract metadata from a watermark of the audio signal, the metadata indicating an origin of synthetic speech in the audio signal. The watermark service may also provide voice verification services to determine whether a voice in an input audio signal matches a voice in an enrolled audio signal. In some implementations, the watermark service analyzes an enrollment audio signal to determine whether the enrollment audio signal includes synthetic speech prior to storing the enrollment audio signal as the enrolled audio signal. The audio signal may be transmitted to the watermark service to determine whether the audio signal includes synthetic speech and/or to verify the identity of a caller, where the audio signal is speech of the caller.

An example of the watermark service is the analysis service 310 of FIG. 3. As discussed herein, the watermark service can detect the watermark of the audio signal and extract metadata by applying a set of keys associated with a plurality of TTS services to the audio signal. The watermark service can determine whether the audio signal includes synthetic speech and/or whether the voice of the caller matches an identity of the caller. The watermark service determines whether the caller should be accepted or rejected. In an example, the audio signal does not include synthetic speech and the voice of the caller matches an identity of the caller, so the watermark service determines that the caller should be accepted (i.e., authenticated). In an example, the audio signal does not include synthetic speech and the voice of the caller does not match an identity of the caller, so the watermark service determines that the caller should not be accepted. In an example, the audio signal includes synthetic speech and the voice of the caller matches an identity of the caller, so the watermark service determines that the caller should not be accepted.

At operation 1030, a response is received from the watermark service based on the watermark. The response may indicate whether the audio signal includes synthetic speech and/or whether the voice of the caller matches the identity of the caller. In some implementations, the response includes a recommendation or determination as to whether to accept (i.e., authenticate the caller).

At operation 1040, based on the response from the watermark service, a determination is made whether to accept or reject the audio signa (i.e., accept or reject the caller). In this way, the audio signal and/or an identity of the caller can be verified using the watermark service.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

obtaining, by a computer, an audio signal including synthetic speech;

extracting, by the computer, metadata from a watermark of the audio signal by applying a set of keys associated with a plurality of text-to-speech (TTS) services to the audio signal, the metadata extracted with a key associated with a TTS service of the set of keys and indicating an origin corresponding to which TTS service generated the synthetic speech in the audio signal; and generating, by the computer, based on the metadata as extracted from the watermark using the key of the set of keys used to generate the watermark, a notification to the TTS service indicated by the metadata, the notification indicating that the audio signal includes the synthetic speech generated at the TTS service.

2. The computer-implemented method of claim 1, further comprising generating a score for each key of the set of keys to determine that the audio signal includes the watermark.

3. The computer-implemented method of claim 2, further comprising transmitting the key to a TTS service to generate the watermark.

4. The computer-implemented method of claim 1, wherein the metadata includes one or more of a service identifier of a TTS service, a model identifier of a TTS model, a user identifier of a user of the TTS service, or a timestamp indicating when the synthetic speech was generated.

5. The computer-implemented method of claim 1, further comprising transmitting to a provider server a second notification indicating the origin of the synthetic speech in the audio signal.

6. The computer-implemented method of claim 1, wherein the notification includes a portion of the metadata as extracted from the watermark.

7. The computer-implemented method of claim 1, further comprising:

receiving, by the computer, from the origin of the synthetic speech, the audio signal including the watermark;

determining, by the computer, that a robustness of the watermark exceeds a predetermined threshold; and transmitting an approval of the watermark to the origin of the synthetic speech.

8. The computer-implemented method of claim 1, wherein the watermark includes a consent watermark, and wherein the notification indicates usage consent parameters of the consent watermark.

9. The computer-implemented method of claim 1, wherein the watermark includes an authorization watermark, and wherein the notification indicates authorization parameters of the authorization watermark.

10. The computer-implemented method of claim 1, further comprising:

obtaining, by the computer, a second audio signal including second synthetic speech;

extracting, by the computer, second metadata from a second watermark of the second audio signal, the second metadata indicating a second origin of the second synthetic speech that is different from the origin of the audio signal including the synthetic speech; and generating, by the computer, a second notification indicating that the second audio signal includes the second synthetic speech.

11. A system comprising:

a computing device comprising at least one processor, configured to:

obtain an audio signal including synthetic speech;

extract metadata from a watermark of the audio signal by applying a set of keys associated with a plurality of text-to-speech (TTS) services to the audio signal, the metadata extracted with a key associated with a TTS service of the set of keys and indicating an origin corresponding to which TTS service generated the synthetic speech in the audio signal; and generate, based on the metadata as extracted from the watermark using the key of the set of keys used to generate the watermark, a notification to the TTS service indicated by the metadata, the notification indicating that the audio signal includes the synthetic speech generated at the TTS service.

12. The system of claim 11, wherein the computing device is further configured to generate a score for each key of the set of keys to determine that the audio signal includes the watermark.

13. The system of claim 12, wherein the computing device is further configured to transmit the key to a TTS service to generate the watermark.

14. The system of claim 11, wherein the metadata includes one or more of a service identifier of a TTS service, a model identifier of a TTS model, a user identifier of a user of the TTS service, or a timestamp indicating when the synthetic speech was generated.

15. The system of claim 11, wherein the computing device is configured to transmit to a provider server a second notification indicating the origin of the synthetic speech in the audio signal.

16. The system of claim 11, wherein the notification includes a portion of the metadata as extracted from the watermark.

17. The system of claim 11, wherein the computing device is configured to:

receive from the origin of the synthetic speech, the audio signal including the watermark;

determine that a robustness of the watermark exceeds a predetermined threshold; and transmit an approval of the watermark to the origin of the synthetic speech.

18. The system of claim 11, wherein the watermark includes a consent watermark, and wherein the notification indicates one or more usage consent parameters of the consent watermark.

19. The system of claim 11, wherein the watermark includes an authorization watermark, and wherein the notification indicates one or more authorization parameters of the authorization watermark.

20. The system of claim 11, wherein the computing device is configured to:

obtain a second audio signal including second synthetic speech;

extract second metadata from a second watermark of the second audio signal, the second metadata indicating a second origin of the second synthetic speech that is different from the origin of the audio signal including the synthetic speech; and generate a second notification indicating that the second audio signal includes the second synthetic speech.

* * * * *